Sept. 3, 1963          P. OPPRECHT          3,102,945

AUTOMATIC SEAM WELDING APPARATUS

Filed June 7, 1960          2 Sheets-Sheet 1

INVENTOR.
Paul Opprecht
BY Michael S. Striker
Attorney

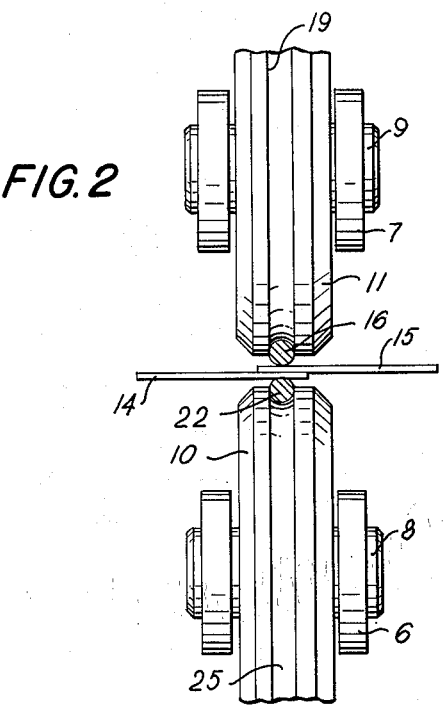
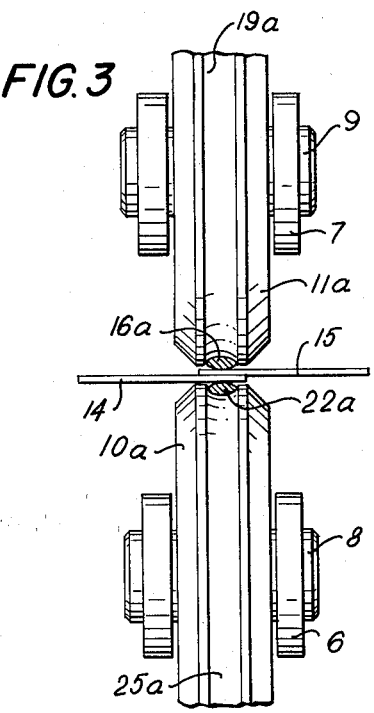
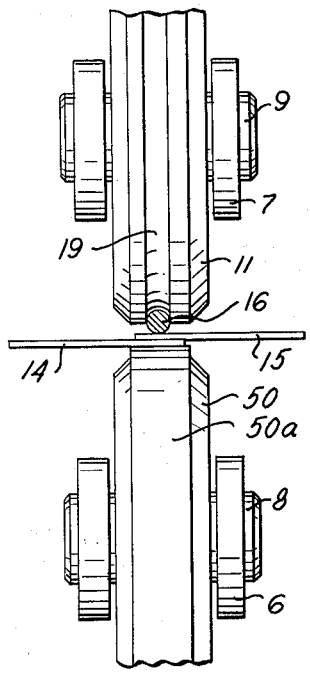
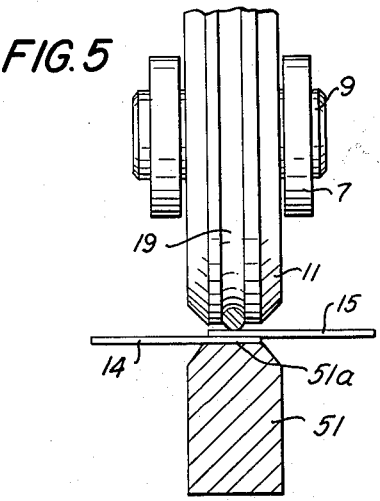

United States Patent Office 3,102,945
Patented Sept. 3, 1963

3,102,945
AUTOMATIC SEAM WELDING APPARATUS
Paul Opprecht, Hintere Rietstrasse 18, Unterengstringen, Zurich, Switzerland
Filed June 7, 1960, Ser. No. 34,480
Claims priority, application Switzerland June 10, 1959
2 Claims. (Cl. 219—81)

The present invention relates to electric welding apparatus in general, and more particularly to an automatic seam welding apparatus which may be utilized for continuous joining of metallic plates, especially tinned, galvanized or cadmium plated sheets consisting of iron, steel, aluminum, brass or the like.

It is already known to utilize roller shaped electrodes for seam welding of metallic sheets. Attempts were also made to provide means which prevents excessive wear of roller electrodes as a result of so-called spark erosion or as a result of contamination by tin, zinc etc. However, all presently known seam welding apparatus fail to provide means capable of preventing the deformation of roller electrodes owing to excessive heat developing in the welding zone and as a result of pressures at which the peripheries of roller electrodes must bear against the workpieces. Furthermore, such prior welding apparatus are suited for the formation of very narrow, thread-like and very precise welding seams, for example, of such seams as are desirable in the manufacture of sheet-metal cans and like products.

A further drawback of presently known seam welding apparatus is that they are not fully automatic. A fully automatic operation of a welding machine is an essential requirement to insure economic operation of modern mass-manufacturing plants.

An important object of the present invention is to provide a fully automatic electric seam welding apparatus.

Another important object of the invention is to provide a fully automatic apparatus adapted to form welding joints between metallic sheets and like workpieces which is constructed and assembled in such a way that it may produce an extremely narrow, substantially thread-like welding seam in a continuous operation.

A further object of the invention is to provide an electric seam welding apparatus in which the electrodes are subjected to lesser wear than in the seam welding apparatus of presently known design.

A concomitant object of the instant invention is to provide a seam welding apparatus in which the electrodes may be readily separated from contaminating material and in which the electrodes may be put to repeated use without impairing the quality of the joint.

With the above objects in view, the invention resides in the provision of a fully automatic electric seam welding apparatus which comprises at least one substantially wire like electrode of such configuration as to be movable into a mere point contact with the workpieces and in which each wire electrode is in substantial surface-to-surface contact with the preferably roller-shaped supporting means therefor which latter also transmits current to the wire electrode. Owing to such construction, and owing to the provision of means which advances each wire electrode at the same speed at which the workpieces are advanced, new zones of the wire electrode come into contact with the workpieces during each phase of the seam welding operation so that the portion of wire electrode which might be contaminated by weldant material during the contact with a workpiece, such as by tin, zinc or the like, does not come into renewed contact with the workpiece unless it is previously cleaned in a suitable apparatus, e.g. a chemical bath, a heating device, or a mechanical stripping mechanism.

According to one preferred form of my invention, both electrodes assume the form of wires whose cross-section may be of circular, elliptical, lenticular or any other suitable contour as long as the electrodes may be moved into a mere point contact with the workpieces and as long as such electrodes may be maintained in comparatively large surface-to-surface contact with the means which conveys the electric current thereto. Alternately, one of the electrodes may be formed as a roller with a cylindrical periphery, or one of the electrodes may assume the shape of a stationary flat-surfaced body.

The improved welding apparatus preferably comprises means for stretching the wire electrode or electrodes to insure proper contact with the current-transmitting support means therefor, and means which advances the wire electrode or electrodes at the speed of the workpieces.

The novel features which are considered as characteristic for the invention are set forth in particular in the appended claims. The invention itself, however, both as to its construction and its method of operation, together with additional objects and advantages thereof, will be best understood from the following detailed description of certain specific embodiments when read in connection with the accompanying drawings, in which:

FIG. 2 is an enlarged fragmentary front elevational view of two wire electrodes utilized in the apparatus of FIG. 1 and of the means for supporting the electrodes during their contact with the workpieces in the welding gap;

FIG. 3 is a fragmentary front elevational view of two modified wire electrodes and of the supporting means therefor;

FIG. 4 illustrates a further modification in the view of FIG. 2 or 3 according to which only one electrode assumes the form of a wire; and FIG. 5 is a fragmentary front elevational view of a further modification which utilizes a wire electrode and a fixed substantially plate-like electrode.

Figure 1:
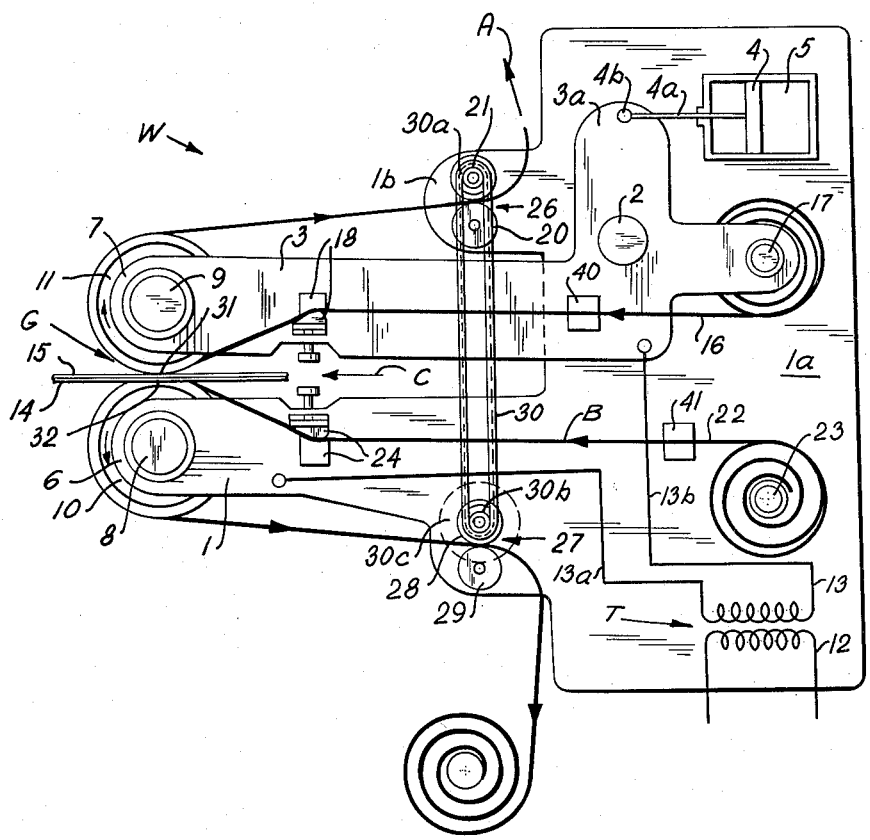
FIG. 1 is a schematic side elevational view of an electric seam welding apparatus embodying my invention.

Referring now in greater detail to the illustrated embodiments, and first to FIG. 1, there is shown an automatic electric resistance welding apparatus W of the seam welding type which is particularly suited for continuously joining the overlapping edges of sheet-metal workpieces, such as tinned iron sheets, aluminum sheets and the like. The apparatus W comprises a frame 1a which is formed with a rigid arm 1 and which also supports a rockable arm 3, the latter assuming the shape of a two-armed lever and rotatably mounted on a pivot axle 2 carried by the frame 1a. The means for rocking the arm 3 may assume a number of forms, for example, such rocking means may comprise one or more prestressed helical or flat springs. In the embodiment of FIG. 1, this rocking means comprises a hydraulic or pneumatic cylinder 5 which receives a double-acting piston 4 connected with a piston rod 4a, the latter articulately fixed to a lug 3a forming part of the arm 3. The connection between the lug 3a and the piston rod 4a comprises a pin 4b. The purpose of the electrode rocking or reciprocating piston-cylinder means 4, 5 is to move the forward end of the arm 3 toward the forward end 6 of the fixed arm 1 so that these arms define therebetween a welding gap G for the passage of the workpieces here shown as two overlapping steel, iron or aluminum plates 14, 15. The rocking means 4, 5 also presses the electrodes with a given force against the exposed sides of the workpieces 14, 15. The forward ends 6, 7 of the arms 1, 3 support two parallel shafts 8, 9 for the pressing or electrode supporting rollers 10, 11, respectively. As is shown in FIG. 2, the forward ends of the arms 1, 3 may be forked so that they define recesses for the rollers 10, 11, respectively. The upper electrode associated with the pressing roller 11 assumes the form of a metallic wire 16 of circular cross-sectional contour; this wire electrode is led in the concave peripheral groove 19 formed in the upper roller 11. The current conducting wire electrode 16 is convoluted onto a suitable supply means, e.g. a spool 17 which is mounted at the rear end of the rockable arm 3 and, on its way to the groove 19, the wire electrode passes between the cooperating components of a guiding and tensioning arrangement 18 which is mounted on the arm 3. After passing about the periphery of the pressing roller 11, the wire electrode 16 is led between a pair of cooperating advancing rolls 20, 21 which are mounted on a bracket 1b forming part of the frame 1a of the welding apparatus and which together constitute an advancing means 26. The rolls 20, 21 are preferably formed with a V-profile and firmly grip the wire electrode 16 so that the latter is advanced in the direction indicated by the arrow A. One of the rolls 20, 21 is preferably under the bias of suitable resilient means to insure proper engagement with the wire electrode 16.

The second electrode 22 also assumes the form of a wire which is of circular cross-sectional contour and is convoluted on so that it may be paid out by a supply means in the form of a spool 23 mounted on the stationary frame 1a. This second wire electrode 22 advances in the direction of the arrow B and passes between the cooperating components of a second guiding and tensioning arrangement 24 which is carried by the fixed arm 1, the electrode 22 thereupon passing through the peripheral groove 25 of the lower pressing or electrode supporting roller 10 (see FIG. 2) and between the rolls 28, 29 of a second advancing means 27 which latter, too, is supported by the fixed arm 1. The configuration and mounting of the rolls 28, 29 is preferably the same as that of the upper rolls 20, 21.

The rotation of advancing rolls 20, 21 and 28, 29 may be synchronized by the provision of an endless chain 30 which travels about two sprockets 30a, 30b mounted on the shafts of rolls 21, 28, respectively. The sprocket 30b is driven by an electric motor 30c or the like. Thus, the wire electrodes 16, 22 are advanced at identical speeds, either continuously or intermittently, and their speeds correspond exactly to the forward speed of the workpieces 14, 15 which advance in the direction indicated by the arrow C. It is also possible to utilize the motor 30c for advancing the workpieces 14, 15. It will be readily understood that the advancing means 26, 27 may be replaced by a single advancing means, for example, by a pair of cooperating rolls each of which is formed with two peripheral notches for the wire electrodes 16, 22.

The means for supplying welding current to the wire electrodes 16, 22 comprises a transformer T which may be mounted on the frame 1a and whose primary winding 12 is adjacent to a secondary winding 13, the latter being connected in a welding circuit whose conductors 13a, 13b pass through the arms 1, 3, respectively, and are electrically connected with the supporting rollers 10, 11, respectively. The circuit of the secondary winding 13 is completed by the workpieces 14, 15 which are in contact with the wire electrodes 22, 16, respectively, the latter in turn being in substantial surface-to-surface contact with the rollers 10, 11, respectively. As can be seen in FIG. 12, the wire electrodes are in comparatively large surface-to-surface contact with the rollers because the configuration of concave grooves 19, 25 is such that their curvature equals the curvature of the respective electrodes. On the other hand, owing to their circular cross-sectional shape, the electrodes 16, 22 are in a mere point contact with the exposed sides of the workpieces 15, 14, respectively (see FIG. 2). The arms 1 and 3 are electrically insulated from one another.

The operation of the improved seam welding apparatus is as follows:

The workpieces 14, 15 are jointly moved in the direction of the arrow C at a certain speed which is identical with the speed at which the wire electrodes 16, 22 advance in the direction of the arrows A, B, respectively. The rocking means 4, 5 presses the electrode 16 against the upper side of the workpiece 15 and thereby urges the workpiece 14 into point contact with the electrode 22. The tensioning means 18, 24 subject the wire electrodes 16, 22 to sufficient tension so that these electrodes remain in continuous substantial surface-to-surface contact with the walls of grooves 19, 25, respectively. Such guidance and stretching insures a very satisfactory flow of current between the rollers 10, 11 and the electrodes 22, 16, respectively so that a good thread-like welding seam is formed along the lines connecting the points of contact between the electrodes and the exposed sides of the overlapping workpieces 14, 15. The points of contact between the electrodes 16, 22 and the outer or exposed sides of workpieces 15, 14, respectively, in the welding gap G are indicated by the reference numerals 31 and 32. Thus, the welding current flows in a circuitous path from the secondary transformer winding 13, through the conductor 13a, through the roller 10, through the wire electrode 22 and the contact point 32, through the workpieces 14, 15, through the contact point 31, through the wire electrode 16, through the upper roller 11, through the conductor 13b and back to the secondary winding 13. During the welding operation, the tin, zinc or other weldant material begins to flow along the lines connecting the points of contact between the coated sheets 14, 15 and the wire electrodes 22, 16, respectively, and spots of molten material are entrained by the wire electrodes as the latter advance from the pressing rollers 10, 11 toward the respective advancing means 27, 26. The weldant material contaminates the surfaces of the wire electrodes, particularly such portions of their surfaces which were in point-to-point contact with the two workpieces. However, such contaminants in no way affect the welding operation because the advancing means 26, 27 insure that new zones of wire electrodes are continuously moved into point contact with the workpieces.

The once used contaminated wire elcetrodes 16, 22 may be melted or may be cleaned in a mechanical or chemical process. In the latter case, the cleaned wire electrodes may be utilized for a second time. When chemically treated, the contaminated wire electrodes are subjected to the action of diluted hydrochloric acid or to the action of diluted caustic soda solution. If the electrodes 16, 22 consist of copper wire, and if such copper wire electrodes are utilized for the seam welding of tinned sheet iron, the tin accumulating on the wires past the welding station in the gap G may be removed by melting. FIG. 1 shows cleaning means 40, 41 for the electrodes 16, 22, respectively. These cleaning means may be disposed between the supply spools and the respective supporting or pressing rollers so that the spools 17, 23 may store contaminated wire electrode material and that the electrodes are cleaned in a fully automatic way during their advance toward the welding gap. Alternately, a single cleaning means may be provided for both wire electrodes.

As stated before, the wire electrodes 16, 22 which are shown in FIGS. 1 and 2 are of circular cross-sectional contour. However, and as shown in FIG. 3, the welding apparatus may utilize wires 16a, 22a of elliptical or lenticular cross-sectional contour without requiring substantial chages in the configuration of other components. Merely the walls of grooves 19a, 25a in the supporting rollers 11a, 10a, respectively, are changed in such a way as to insure large surface-to-surface contact with the respective wire electrodes. Also the shape of advancing rolls is modified accordingly. The configuration of wire electrodes must be such that they may come into point-to-point contact with the workpieces and that they come into surface-to-surface contact with the current conducting means.

FIG. 4 shows a further modification of my invention which utilizes a wire electrode 16 guided by a grooved or notched pressing roller 11, and an unnotched roller electrode 50 which is formed with a preferably cylindrical peripheral surface 50a. It will be noted that the cylindrical surface 50a is of considerable width so as to reduce the specific load of the welding current. Consequently, the zinc or tin coming into contact with the surface 50a is not heated to its melting temperature and no contamination of the surface 50a will take place. This roller electrode 50 is subjected to very little wear and may be utilized for long periods of time. Furthermore, a greater reduction in wear upon the unnotched roller electrode 50 and the prevention of any deposition of weldant material on the surface 50a may be insured by cooling the electrode 50 in any suitable manner, not shown in FIG. 4.

In some instances, i.e. for certain specific welding operations, it has been found advisable to form one of the electrodes as a stationary member 51 (see FIG. 5) which comprises an elongated contact surface 51a of preferably rectangular contour. The advantages of such arrangement are the same as those of the arrangement shown in FIG. 4 with the exception that the wear upon the surface 51a might be somewhat higher.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a welding apparatus for seam welding of overlapping at least intermittently moving workpieces, such as metallic sheets and the like, in combination, a frame; a first arm rigidly connected with and having an end extending from said frame; a second arm rockably mounted on said frame and having an end movable toward and away from the end of said first arm; means connected with said second arm and mounted on said frame for rocking the second arm at least in a direction to move the end of the second arm toward the end of the first arm; a first and a second roller rotatably mounted at the end of said first and second arm, respectively, said rollers formed with peripheral grooves and defining therebetween a welding gap for the passage of the workpieces; a first and a second supply spool rotatably mounted on said frame and said second arm, respectively; a first and a second wire electrode convoluted on said first and second spool, respectively, said electrodes extending about and received in the grooves of said first and second roller, respectively; means for advancing said first and second wire electrodes at synchronous speed equal to the speed of the workpieces in such manner that the electrodes are paid out by the respective spools and are advanced toward and about the respective rollers, said advancing means comprising a pair of rolls for each electrode, motor means supported by said frame, and transmission means connected to said motor means and said rolls for transmitting a drive from said motor means to said rolls, the configuration of said grooves being such that the electrodes are in substantial surface-to-surface contact with the respective rollers and each electrode being of such configuration as to be movable into point contact with a workpiece in said gap when the end of the second arm is rocked in a direction toward the end of said first arm, said rollers rotated when the electrodes are advanced by said advancing means whereby new zones of said electrodes are continuously moved into point contact with the workpieces in said gap when the electrodes are paid out by the respective spools; and a welding circuit including conductor means connected with each of said rollers, said circuit being completed only when the electrodes are in contact with the workpieces in said gap.

2. In a welding apparatus for seam welding of overlapping at least intermittently moving workpieces, such as metallic sheets and the like, in combination, a frame; a first arm rigidly connected with and having an end extending from said frame; a second arm rockably mounted on said frame and having an end movable toward and away from the end of said first arm; fluid operated piston-cylinder means connected with said second arm and mounted on said frame for rocking the second arm at least in a direction to move the end of the second arm toward the end of the first arm; a first and a second roller rotatably mounted at the end of said first and second arm, respectively, said rollers formed with peripheral grooves and defining therebetween a welding gap for the passage of the workpieces; a first and a second supply spool rotatably mounted on said frame and said second arm, respectively; a first and a second wire electrode convoluted on said first and second spool, respectively, said electrodes extending about and received in the grooves of said first and second roller, respectively; means for advancing said first and second wire electrodes at synchronous speed equal to the speed of the workpieces in such manner that the electrodes are paid out by the respective spools and are advanced toward and about the respective rollers, said advancing means comprising a pair of rolls for each electrode, motor means supported by said frame, and chain and sprocket means operatively connected with said rolls and with said motor means, the configuration of said grooves being such that the electrodes are in substantial surface-to-surface contact with the respective rollers and each electrode being of such configuration as to be movable into point contact with a workpiece in said gap when the end of the second arm is rocked in a direction toward the end of said first arm, said rollers rotated when the electrodes are advanced by said advancing means whereby new zones of said electrodes are continuously moved into point contact with the workpieces in said gap when the electrodes are paid out by the respective spools; and a welding circuit including conductor means connected with each of said rollers, said circuit being completed only when the electrodes are in contact with the workpieces in said gap.

References Cited in the file of this patent

UNITED STATES PATENTS

| | | |
|---|---|---|
| Re. 16,276 | Cary | Feb. 23, 1926 |
| 1,300,603 | Gravell | Apr. 15, 1919 |
| 1,308,778 | Gravell | July 8, 1919 |
| 2,838,651 | Smith | June 10, 1958 |
| 3,015,713 | Eckler et al. | Jan. 2, 1962 |